(12) United States Patent
Go

(10) Patent No.: US 8,770,537 B2
(45) Date of Patent: Jul. 8, 2014

(54) FIXING DEVICE OF HYDRAULIC PIPE OF CONSTRUCTION MACHINE

(75) Inventor: Joon-Seog Go, Changwon-si (KR)

(73) Assignee: Volvo Construction Equipment AB (SE)

( * ) Notice: Subject to any disclaimer, the term of this patent is extended or adjusted under 35 U.S.C. 154(b) by 0 days.

(21) Appl. No.: 13/639,936

(22) PCT Filed: May 17, 2010

(86) PCT No.: PCT/KR2010/003098
§ 371 (c)(1),
(2), (4) Date: Oct. 8, 2012

(87) PCT Pub. No.: WO2011/145756
PCT Pub. Date: Nov. 24, 2011

(65) Prior Publication Data
US 2013/0048826 A1 Feb. 28, 2013

(51) Int. Cl.
*F16L 3/00* (2006.01)
*F16L 3/08* (2006.01)
*B66C 23/00* (2006.01)

(52) U.S. Cl.
USPC .............. 248/560; 248/49; 248/68.1; 248/62; 248/74.1; 248/74.4; 248/51; 248/52; 414/722; 212/347; 37/397

(58) Field of Classification Search
USPC ......... 248/560, 49, 68.1, 62, 74.1, 74.4, 67.7, 248/65, 316.1, 67.5, 73, 51, 52; 414/722, 414/727; 212/347; 37/397, 466
See application file for complete search history.

(56) References Cited

U.S. PATENT DOCUMENTS 5,435,506 A * 7/1995 Wiley .......................... 248/74.1
5,941,483 A * 8/1999 Baginski ...................... 248/68.1
(Continued)

FOREIGN PATENT DOCUMENTS

JP 02-511693 Y2 7/1996
JP 2003-003516 A 1/2003
(Continued)

OTHER PUBLICATIONS

Written Opinion of the International Searching Authority (in Korean) for PCT/KR2010/003098, mailed Feb. 21, 2011; ISA/KR.
(Continued)

*Primary Examiner* — Terrell McKinnon
*Assistant Examiner* — Christopher Garft
(74) *Attorney, Agent, or Firm* — Harness, Dickey & Pierce, P.L.C.

(57) ABSTRACT

Disclosed therein is an apparatus for fixing hydraulic pipes for a construction machine having a hydraulic pipe clamp fixing a plurality of pipes to a boom structure, including: a lower clamp (20) having a mounting hole (21); a clamp position setting member (22) for fixing the lower clamp (20) to one side of the boom structure (100) through a clamp support member (23) coupled to the mounting hole (21); an upper clamp (30) coupled onto the lower clamp (20) and having an interference prevention groove (31) in which a head portion (23a) of the clamp support member (23) is placed; and vibration-proof members (41,42) attached to the interiors of the clamps (20,30) to absorb vibration of the pipe (10). When the pipes (10) are assembled or disassembled, the lower clamp (20) is fixed to the boom structure to set the positions of the pipe and the clamp, and thus the assembly is greatly improved. Also, the clamp position setting member (22) for the lower clamp (20) is protected by the upper clamp (10) without being exposed to the outside, and is maintained without interfering with the outside.

18 Claims, 2 Drawing Sheets

(56) References Cited

U.S. PATENT DOCUMENTS

| | | | |
|---|---|---|---|
| 6,234,277 B1* | 5/2001 | Kaczmarek | 187/414 |
| 6,883,761 B2* | 4/2005 | Boon et al. | 248/74.1 |
| 7,401,753 B2* | 7/2008 | Bozmoski et al. | 248/68.1 |
| 7,530,536 B2* | 5/2009 | Hashimoto | 248/68.1 |
| 8,523,120 B2* | 9/2013 | Asano et al. | 248/68.1 |
| 2002/0179780 A1* | 12/2002 | Benoit et al. | 248/73 |
| 2004/0159751 A1* | 8/2004 | Boon et al. | 248/74.1 |
| 2006/0006292 A1* | 1/2006 | Kleeb et al. | 248/74.1 |
| 2008/0245932 A1* | 10/2008 | Prellwitz et al. | 248/49 |

FOREIGN PATENT DOCUMENTS

| | | |
|---|---|---|
| JP | 2003-106312 A | 4/2003 |
| JP | 2004-138095 A | 5/2004 |
| KR | 1998-011572 U | 5/1998 |

OTHER PUBLICATIONS

International Preliminary Report on Patentability (Chapter II of the Patent Cooperation Treaty) for PCT/KR2010/003098 (in Korean), Issued Aug. 27, 2012.

* cited by examiner

FIXING DEVICE OF HYDRAULIC PIPE OF CONSTRUCTION MACHINE

TECHNICAL FIELD

The present invention relates to an improved apparatus for fixing hydraulic pipes for a construction machine, and more particularly, to an apparatus for fixing hydraulic pipes for a construction machine which includes a lower clamp previously fixed on a boom structure without any external interference by a clamp position setting member when hydraulic pipes are mounted to an upper clamp assembled together with the lower clamp so as to fix and maintain pipes without any vibration or shaking.

BACKGROUND ART

In general, in construction machines, working devices including booms or buckets are operated by hydraulic pressure to support a heavy load, and in order to provide hydraulic pressure, hydraulic pipes made of flexible rubber or metal are complicatedly installed adjacent to a boom structure.

The hydraulic pipes for the construction machine may be manufactured in various forms according to the strength of hydraulic pressure or requirements for the working devices, and particularly, hydraulic pipes for operating the booms, arms and buckets are fixed to the boom structure through a plurality of fixing devices for pipes in such a fashion that necessary hydraulic pressure is supplied without being prevented by moving traces generated by ascent, descent and rotation of the working devices.

However, because the construction machines or working devices require high specification in length and weight of hydraulic pipes when the hydraulic pipes are assembled, a high degree of competency for assembly is needed, and the number of working processes for setting positions of pipes, mounting clamps, fixing the pipes using jigs or cranes for mounting the pipes is largely increased.

In the meantime, Korean Utility Model Laid-open No. 1998-011572 discloses a hydraulic pipe fixing apparatus for heavy equipment. FIGS. 1 and 2 are schematic diagrams of the hydraulic hose fixing apparatus for heavy equipment according to the prior art. In Korean Utility Model Laid-open No. 1998-011572, the hydraulic pipe fixing apparatus includes: a hose clamp 1 having a plurality of annular portions 1a formed integrally and cut at one side so as to make hydraulic hoses 10 closer; and a fixing bracket 2 for fixing the clamp 1 to one side of a boom structure, so that the hydraulic hoses are neatly fixed on the boom structure 100.

Accordingly, it is well known that the structure, according to the prior art, can prevent damage due to friction generated between the hydraulic hoses 10 and enhance maintainability.

However, the hydraulic pipe fixing apparatus for heavy equipment, according to the prior art, can reduce friction between the hydraulic hoses 10 in the state where the hose clamp 1 is first mounted outside the hydraulic hoses 10, but the hose clamp 1 and the hydraulic hoses 10 are still vibrating or shaking on the boom structure 100, and such a movement of the hydraulic hoses may increase the risk of accidents.

That is, when the hydraulic hoses are disassembled or assembled, the movement occurs in a state where the hydraulic hoses are mounted inside the hose clamp 1, and hence, an additional jig for disassembling and assembling the hydraulic hoses 10 are needed and additional processes for preventing the movement are required. Moreover, the prior art has another problem in that it is difficult to regulate the exact positions of the hose clamp 1 and the hydraulic hoses 10 before the fixing bracket 2 is completely assembled.

DISCLOSURE

Technical Problem

Accordingly, the present invention has been made in an effort to solve the above-mentioned problems occurring in the prior arts, and it is an object of the present invention to provide an apparatus for fixing hydraulic pipes for a construction machine in which a lower clamp is first fixed to a boom structure through a clamp position setting member and an upper clamp is mounted on the outside of pipes for fixing the pipes when pipes used in a construction machine are assembled and disassembled.

Another object of the present invention is to provide an apparatus for fixing hydraulic pipes for a construction machine in which the clamp position setting member is protected and maintained in a clamp without being exposed to the outside by the upper clamp and which does not cause external interference when the pipes are fixed.

Technical Solution

To achieve the above objects, the present invention provides an apparatus for fixing hydraulic pipes for a construction machine, which has a hydraulic pipe clamp for fixing a plurality of pipes to a boom structure, including: a lower clamp having a mounting hole; a clamp position setting member for fixing the lower clamp to one side of the boom structure through a clamp support member coupled to the mounting hole; an upper clamp coupled onto the lower clamp and having an interference prevention groove in which a head portion of the clamp position setting member is placed; and vibration-proof members attached to the interiors of the clamps to absorb the vibration of the pipes.

Moreover, the lower clamp comprises a flat plate portion adjacent to the mounting hole and a pipe support portion extending from the flat plate portion to support the pipe.

Furthermore, the upper clamp comprises a flat plate portion adjacent to the interference prevention groove and a pipe cover portion extending from the flat plate portion to cover the pipe.

Additionally, the pipe support portion and the pipe cover portion are in the form of a semicircular shape.

In addition, the apparatus for fixing hydraulic pipes further includes a vibration-proof member installed between the upper clamp and the lower clamp.

Moreover, the vibration-proof member includes a plurality of divided vibration-proof pieces and is installed between the pipe support portion and the pipe cover portion.

Advantageous Effects

The apparatus for fixing hydraulic pipes for a construction machine according to the present invention greatly enhances its ability to be assembled because the lower clamp is fixed to the boom structure for setting the positions of the pipes and clamps when the hydraulic pipes are assembled and disassembled. Furthermore, the clamp position setting member for supporting the lower clamp is protected by the upper clamp not to be exposed to the outside, and the pipe assembled state can be maintained in such a fashion that there is no external interference.

BEST MODE FOR INVENTION

Figure 1:
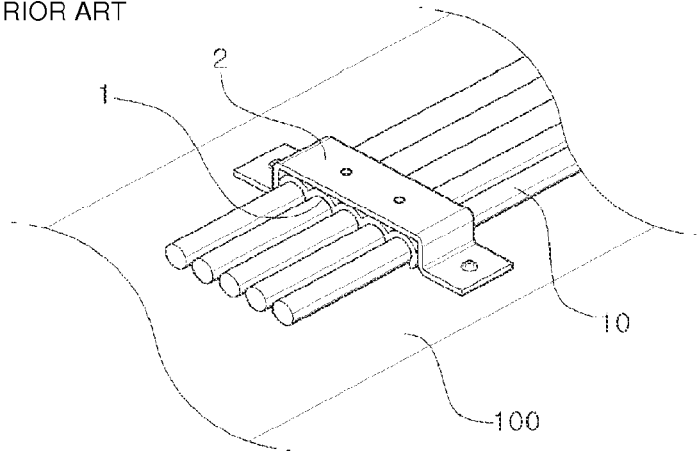
FIG. 1 is a perspective view of a hydraulic pipe fixing apparatus for heavy equipment according to a prior art.
Figure 2:
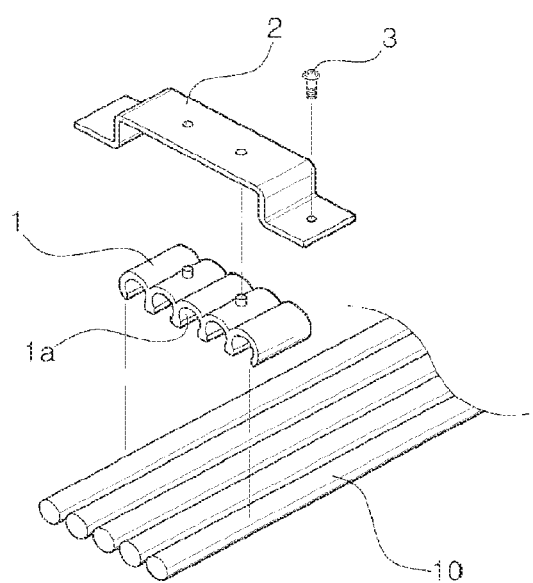
FIG. 2 is an exploded perspective view of the hydraulic pipe fixing apparatus illustrated in FIG. 1.
Figure 3:
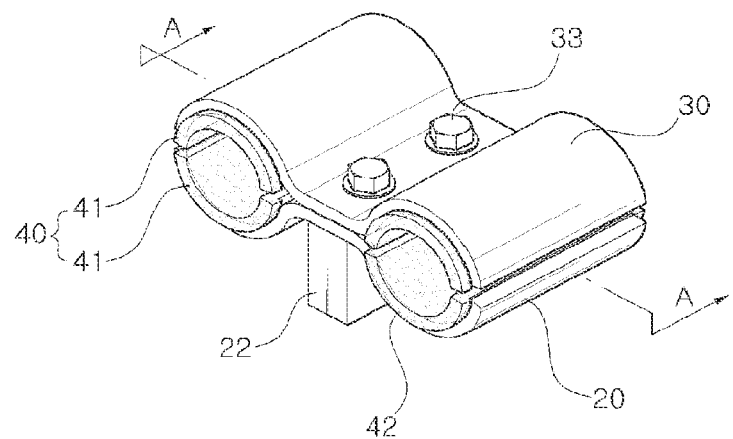
FIG. 3 is a perspective view of an apparatus for fixing hydraulic pipes for a construction machine according to a preferred embodiment of the present invention.
Figure 4:
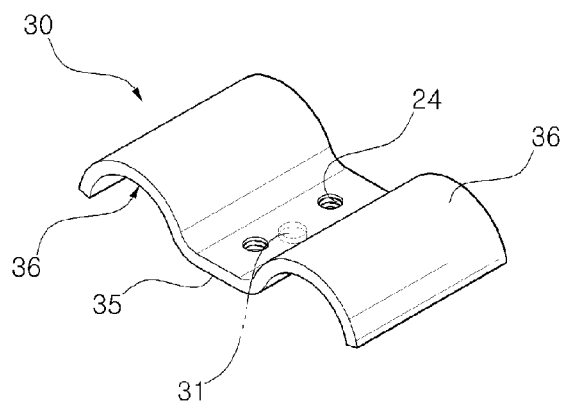
FIG. 4 is a schematically perspective view of an upper clamp of the apparatus for fixing hydraulic pipes according to the present invention.
Figure 5:
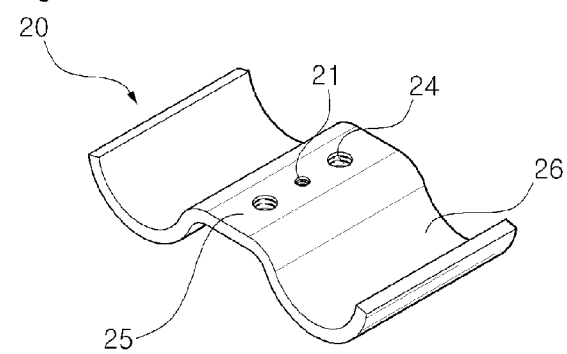
FIG. 5 is a schematically perspective view of a lower clamp of the apparatus for fixing hydraulic pipes according to the present invention.

Reference will be now made in detail to the preferred embodiments of the present invention with reference to the attached drawings.

Referring to FIGS. 3 to 6, a preferred embodiment of the present invention will be described.

An apparatus for fixing hydraulic pipes for a construction machine, which has a hydraulic pipe clamp for fixing a plurality of pipes 10 to a boom structure 100, includes: a lower clamp 20 having a mounting hole 21; a clamp position setting member 22 for fixing the lower clamp 20 to one side of the boom structure 100 through a clamp support member 23 coupled to the mounting hole 21; an upper clamp 30 coupled onto the lower clamp 20 and having an interference prevention groove 31 in which a head portion 23a of the clamp support member 23 is placed; and vibration-proof members 41 and 42 attached to the interiors of the clamps 20 and 30 to absorb vibration of the pipes 10.

The clamp support member 23 may be a flat headed bolt in consideration of a pipe support load, and the interference prevention groove 31 may be a through hole.

Moreover, the clamp position setting member 22 includes a metal sheet material attached to an upper portion of the boom structure 100, and it is preferable that the upper clamp 30 and the lower clamp 20 are spaced apart from each other at a predetermined interval on the boom structure 100 by the clamp position setting member 22 when the pipes 10 are mounted.

The lower clamp 20 includes a flat plate portion 25 adjacent to the mounting hole 21 and pipe support portions 26 extending from the flat plate portion 25 to support the pipes 10.

It is preferable that the pipe support portions 26 are formed at both sides of the flat plate portion 25 so that the pipes 10 are arranged at a predetermined interval.

Furthermore, the upper clamp 30 includes a flat plate portion 35 adjacent to the interference prevention groove 31 and pipe cover portions 36 extending from the flat plate portion 35 to cover the pipes 10.

The lower clamp 20 and the upper clamp 30 respectively have coupling holes 24 to which a fixing member 33 for fixing the lower clamp 20 and the upper clamp 30 to the clamp position setting member 22 is coupled, and the coupling holes 24 are formed on the flat plate portions 25 and 35.

Preferably, the pipe support portions 26 and the pipe cover portions 36 are respectively formed in a semicircular shape in order to protect and maintain the pipes 10 at predetermined intervals.

A vibration-proof member 40 is mounted between the upper clamp 30 and the lower clamp 20, and preferably, vibration-proof members 40 are respectively mounted between the pipe support portions 26 and the pipe cover portions 36.

The vibration-proof member 40 includes a plurality of divided vibration-proof pieces 41 and separation-preventing jaws 42 respectively formed at front ends of the vibration-proof pieces 41.

The vibration-proof pieces 41 may be divided in a longitudinal direction of the pipe 10, and according to circumstances, may be dividedly formed on the outer circumferential surface of the pipe 10 in numbers.

The front end portion of the pipe cover portion 35 of the upper clamp 30 and the front end portion of the pipe support portion 25 of the lower clamp 20 are kept in a non-contact condition to each other when they are assembled in consideration of pressure suitable for diameter or size of the pipe 10. If the diameter of the pipe 10 required according to the specifications of the construction machine is too large or a user wants to regulate pressure, an interval between the front end portion of the pipe cover portion 35 of the upper clamp 30 and the front end portion of the pipe support portion 25 of the lower clamp 20 can be regulated.

The above-mentioned pressure means a force that the pipe cover portion 35 of the upper clamp 30 and the pipe support portion 25 of the lower clamp 20 compresses and supports the pipes 100 in a state where the pipes are completely assembled, and can be changed in such a fashion that various elastic forces can be added according to changes of qualities of materials.

Figure 6:
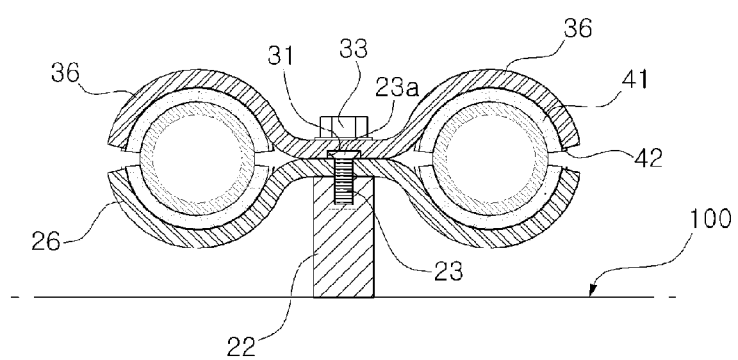
FIG. 6 is a sectional view taken along the line of A-A of FIG. 3.
Figure 7:
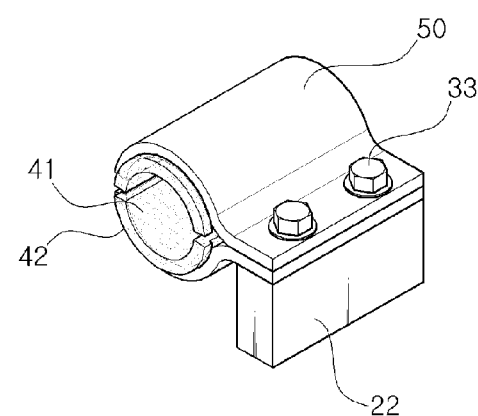
FIG. 7 is a perspective view of an apparatus for fixing hydraulic pipes for a construction machine according to another preferred embodiment of the present invention.

In the meantime, according to FIG. 7 illustrating another preferred embodiment of the present invention, in consideration of other interference of adjacent pipes, the clamps 20 and 30 shown in FIG. 6 may be transformed in an asymmetrical structure.

For instance, a pipe cover portion 50 and a pipe support portion 51 may be formed only at one side of the flat plate portions 25 and 35, and the reason is to provide an interference-preventing function and to properly apply elements of the pipe support portion 26 and the pipe cover portion 36 according to the demand of pipes.

MODE FOR INVENTION

Referring to the above preferred embodiments, the action and the operation principle of the apparatus for fixing hydraulic pipes for a construction machine according to the present invention will be described.

When the pipes 10, including hydraulic hoses and hydraulic pipes, are assembled and mounted on the boom structure 100 of the construction machine, the clamp position setting member 22 is previously attached to the upper portion of the boom structure 100.

The clamp position setting member 22 serves to set the previously fixed position of the lower clamp 20. That is, after the clamp position setting member 22 is attached to the boom structure 100, the clamp support member 23 is mounted on the mounting hole 21 of the clamp position setting member 22, and in this instance, the head portion of the clamp support member 23 is seated on the interference prevention groove 31 formed in the flat plate portion 35 of the upper clamp 30.

The interference prevention groove 31 has the through hole structure opposed to the mounting hole 21, and in this instance, the upper clamp 30 and the lower clamp 20 are mounted in an approximately symmetrical structure.

After the assembly of the pipes is finished, the clamp support member does not project and is not exposed to the outside of the upper clamp 30 and the lower clamp 20 is firmly fixed and maintained without any interference with other pipes.

Meanwhile, in order to restrict vibration applied to the pipes 10, the vibration-proof member 40 may be previously seated inside the pipe support portion 26, but for convenience in work, the vibration-proof member 40 may be previously assembled to the pipe 10 in a forcedly fit state.

When the pipes 10 are seated in the pipe support portions 26 and the vibration-proof members 40 of the lower clamp 20 in an approximately parallel state, the flat plate portion 35 of the upper clamp 30 comes in surface contact with the flat plate portion 25 of the lower clamp 20, and then, the upper clamp 30 and the lower clamp 20 are firmly fixed by the fixing member 33.

After the pipes are completely assembled, the front end portion of the pipe cover portion 35 of the upper clamp 30 and the front end portion of the pipe support portion 25 of the lower clamp 20 supports the pipes 10 in the mutually non-contact state.

The structure illustrated in FIG. 7 is advantageous when just one pipe is mounted to the boom structure 100. The operation principle that the pipe 10 is seated inside the pipe cover portion 50 of the upper clamp 50 and the pipe support portion 51 of the lower clamp 20 in a non-parallel state is the same as the above description, and hence, its detailed description will be omitted.

INDUSTRIAL APPLICABILITY

The apparatus for fixing hydraulic pipes for a construction machine according to the present invention can first assemble the lower clamp 20 through the clamp position setting member 22 and the clamp support member 23, and then, simply assemble and install the upper clamp 30 for fixing the pipes, and hence, the user can effectively assemble the pipes without using any crane or jig that is additionally required in the prior art.

Additionally, the pipe assembly work according to the present invention can solve problems of the prior art in that the position setting and fixing of the lower clamp on the boom structure of a sheet are not good during the assembling process and in that it is difficult to assemble the clamps and accidents are caused due to a severe movement. Moreover, after the assembly of the pipes is finished, the clamp position setting member for fixing the clamps is completely embedded in the upper clamp so as to restrict the external interference.

The invention claimed is:

1. An apparatus for fixing hydraulic pipes for a construction machine, which has a hydraulic pipe clamp for fixing a plurality of pipes to a boom structure, comprising:
   a lower clamp having a mounting hole;
   a clamp position setting member for fixing the lower clamp to one side of the boom structure through a clamp support member coupled to the mounting hole;
   an upper clamp coupled onto the lower clamp and having an interference prevention groove in which a head portion of the clamp support member is placed; and
   vibration-proof members attached to interiors of the clamps to absorb vibration of the pipes;
   wherein the vibration-proof members are installed between the upper clamp and the lower clamp; and
   wherein the vibration-proof members include a plurality of divided vibration-proof pieces installed between a pipe support portion of the lower clamp and a pipe cover portion of the upper clamp; and
   wherein the upper clamp comprises a flat plate portion including a bottom surface configured to contact the lower clamp, the bottom surface including the interference prevention groove, and the pipe cover portion extending from the flat plate portion to cover the pipe.

2. The apparatus for fixing hydraulic pipes according to claim 1, wherein the lower clamp comprises a flat plate portion including the mounting hole and the pipe support portion extending from the flat plate portion to support the pipe.

3. The apparatus for fixing hydraulic pipes according to claim 2, wherein the pipe support portion is in the form of a semicircular shape.

4. The apparatus for fixing hydraulic pipes according to claim 1, wherein the pipe cover portion is in the form of a semicircular shape.

5. The apparatus for fixing hydraulic pipes according to claim 1, wherein the interference prevention groove is penetratingly formed in the flat plate portion.

6. The apparatus for fixing hydraulic pipes according to claim 1, wherein the interface prevention groove faces the lower clamp.

7. The apparatus for fixing hydraulic pipes according to claim 1, wherein the upper clamp is coupled to the lower clamp with a first fixing member and a second fixing member, the clamp support member is between the first fixing member and the second fixing member.

8. A hydraulic pipe clamp apparatus for fixing a plurality of hydraulic pipes to a boom of a construction machine, the apparatus comprising:
   a clamp position setting member configured to be mounted to the boom;
   a lower clamp including a mounting hole and configured to be mounted to the clamp position setting member with a clamp support member extending through the mounting hole;
   an upper clamp configured to be coupled to the lower clamp to secure the hydraulic pipes between the upper clamp and the lower clamp, the upper clamp having an interference prevention groove facing the lower clamp, the interference prevention groove is configured to receive therein a head portion of the clamp support member; and
   vibration-proof members attached to interiors of the lower clamp and the upper clamp to absorb vibration of the hydraulic pipes wherein the upper clamp includes a flat plate portion including a bottom surface configured to contact the lower clamp, the bottom surface defining the interference prevention groove, the upper clamp further includes a pair of pipe cover portions extending from opposite sides of the flat plate portion to cover the plurality of hydraulic pipes.

9. The apparatus of claim 8, wherein the lower clamp includes a flat plate portion defining the mounting hole and a pair of pipe support portions extending from opposite sides of the flat plate portion to support the plurality of hydraulic pipes.

10. The apparatus of claim 8, wherein each one of the pair of pipe support portions are semi-circular; and
    wherein each one of the pair of pipe cover portions are semi-circular.

11. The apparatus of claim 8, wherein the upper clamp is coupled to the lower clamp with a first fixing member and a second fixing member, the clamp support member is between the first fixing member and the second fixing member.

12. The apparatus of claim 11, wherein the upper clamp includes first and second coupling holes on opposite sides of the interference prevention groove, and the lower clamp includes first and second coupling holes on opposite sides of the mounting hole, the first coupling hole of the upper clamp is aligned with the first coupling hole of the lower clamp to receive the first fixing member therethrough, and the second coupling hole of the upper clamp is aligned with the second coupling hole of the lower clamp to accommodate the second fixing member therethrough.

13. The apparatus of claim 8, wherein the vibration-proof member includes a plurality of divided vibration-proof pieces.

14. A hydraulic pipe clamp apparatus for fixing a plurality of hydraulic pipes to a boom of a construction machine, the apparatus comprising:
   a clamp position setting member configured to be mounted to the boom;
   a lower clamp including a lower flat plate portion with a first pipe support and a second pipe support extending from opposite sides of the lower flat plate portion, the lower flat plate portion defining a mounting hole between a first coupling hole and a second coupling hole, the mounting hole configured to receive a clamp support member therethrough to couple the lower clamp to the clamp position setting member;
   an upper clamp including an upper flat plate portion with a first pipe cover portion and a second pipe cover portion extending from opposite sides of the upper flat plate portion, the upper flat plate portion defining an interference prevention groove on a side thereof facing the lower clamp, the interference prevention groove configured to receive a head of the clamp support member therein, the upper flat plate portion further defining a first coupling hole and a second coupling hole on opposite sides of the interference prevention groove, the first coupling hole of the upper clamp aligns with the first coupling hole of the lower clamp to receive a first fixing member therethrough to secure the upper clamp to the lower clamp, and the second coupling hole of the upper clamp aligns with the second coupling hole of the lower clamp to receive a second fixing member therethrough to secure the upper clamp to the lower clamp; and
   vibration-proof members attached to interiors of each of the first and the second pipe cover portions, and the first and the second pipe supports;
   wherein the first pipe cover portion is opposite to the first pipe support to receive and retain a first pipe of the plurality of hydraulic pipes therebetween, and the second pipe cover portion is opposite to the second pipe support to receive and retain a second pipe of the plurality of hydraulic pipes therebetween to absorb vibration of the first pipe and the second pipe with the vibration-proof members.

15. The apparatus of claim 14, wherein each one of the first pipe support, the second pipe support, the first pipe cover, and the second pipe cover are semi-circular.

16. The apparatus of claim 14, wherein each one of the vibration-proof members are spaced apart from one another.

17. The apparatus of claim 14, wherein a first separation-preventing jaw is defined between first opposing vibration-proof members, and a second separation-preventing jaw is defined between second opposing vibration-proof members.

18. The apparatus of claim 14, wherein each one of the lower clamp, the upper clamp, and the clamp position setting member are individual pieces configured to be coupled together.

* * * * *